United States Patent
Edelstein et al.

(10) Patent No.: US 10,380,590 B2
(45) Date of Patent: Aug. 13, 2019

(54) TRANSACTION AUTHENTICATION BASED ON METADATA

(71) Applicant: International Business Machines Corporation, Armonk, NY (US)

(72) Inventors: Orit Edelstein, Haifa (IL); Sharon Keidar-Barner, Megiddo (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/371,241

(22) Filed: Dec. 7, 2016

(65) Prior Publication Data

US 2018/0158061 A1 Jun. 7, 2018

(51) Int. Cl.
G06Q 20/40 (2012.01)
H04L 29/06 (2006.01)
H04W 12/06 (2009.01)
G06Q 20/08 (2012.01)
G06Q 20/32 (2012.01)
G06Q 20/10 (2012.01)

(52) U.S. Cl.
CPC ....... *G06Q 20/4014* (2013.01); *G06Q 20/085* (2013.01); *G06Q 20/322* (2013.01); *H04L 63/0853* (2013.01); *H04L 63/0876* (2013.01); *H04W 12/06* (2013.01); *G06Q 20/10* (2013.01); *G06Q 20/4016* (2013.01)

(58) Field of Classification Search
CPC ............................. G06Q 20/4016; G06Q 20/10
See application file for complete search history.

(56) References Cited

U.S. PATENT DOCUMENTS

| | | | |
|---|---|---|---|
| 8,918,479 B2 | 12/2014 | O'Cpnnell et al. | |
| 8,918,904 B2 | 12/2014 | Sanin et al. | |
| 2014/0214670 A1* | 7/2014 | McKenna | G06Q 20/40145 705/44 |
| 2015/0269577 A1* | 9/2015 | Avegliano | G06Q 20/4016 705/44 |
| 2015/0278504 A1 | 10/2015 | Azim et al. | |
| 2016/0189153 A1 | 6/2016 | Luk et al. | |
| 2017/0169431 A1* | 6/2017 | Groarke | G06Q 20/4016 |

OTHER PUBLICATIONS

Sanchez, Rosa; "Enhancing Privacy and Dynamic Federation in IdM for Consumer Cloud Computing", Mar. 21, 2012, IEEE, vol. 58, No. 1 (Year: 2012).*

* cited by examiner

*Primary Examiner* — Kito R Robinson
*Assistant Examiner* — Abdulmajeed Aziz
(74) *Attorney, Agent, or Firm* — Barry Blount

(57) ABSTRACT

In some examples, a system for authenticating transactions can include a processor to detect metadata corresponding to a user of a mobile device, wherein the metadata comprises a call history from the mobile device. The processor can also detect transaction information corresponding to the user of the mobile device from a remote server, wherein the transaction information corresponds to a transaction initiated at a remote service provider and wherein the transaction information indicates a transaction type and transaction initiator information. The processor can also generate an authentication score of the transaction based on the metadata and the transaction information. The processor can also authorize the transaction based on the authentication score.

16 Claims, 6 Drawing Sheets

200

TRANSACTION AUTHENTICATION BASED ON METADATA

BACKGROUND

The present disclosure relates to transaction authentication, and more specifically, but not exclusively, to authenticating transactions based on metadata from a mobile device.

SUMMARY

According to an embodiment described herein, a system for transaction authentication can include a processor to detect metadata corresponding to a user of a mobile device, wherein the metadata comprises a call history from the mobile device. The processor can also detect transaction information corresponding to the user of the mobile device from a remote server, wherein the transaction information corresponds to a transaction initiated at a remote service provider and wherein the transaction information indicates a transaction type and transaction initiator information. Additionally, the processor can generate an authentication score of the transaction based on the metadata and the transaction information and authorize the transaction based on the authentication score.

According to another embodiment, a method for transaction authentication can include detecting, via a processor, metadata corresponding to a user of a mobile device, wherein the metadata comprises a call history from the mobile device. The method can also include detecting, via the processor, transaction information corresponding to the user of the mobile device from a remote server, wherein the transaction information corresponds to a transaction initiated at a remote service provider and wherein the transaction information indicates a transaction type and transaction initiator information. Furthermore, the method can include generating, via the processor, an authentication score of the transaction based on the metadata and the transaction information, and authorizing, via the processor, the transaction based on the authentication score.

According to another embodiment, a computer program product for transaction authentication can include a computer readable storage medium having program instructions embodied therewith, wherein the computer readable storage medium is not a transitory signal per se. The program instructions can be executable by a processor to cause the processor to detect metadata corresponding to a user of a mobile device, wherein the metadata comprises a call history from the mobile device. The program instructions can also be executable by the processor to cause the processor to detect transaction information corresponding to the user of the mobile device from a remote server, wherein the transaction information corresponds to a transaction initiated at a remote service provider and wherein the transaction information indicates a transaction type and transaction initiator information. Furthermore, the program instructions can be executable by the processor to cause the processor to generate an authentication score of the transaction based on the metadata and the transaction information and authorize the transaction based on the authentication score.

DETAILED DESCRIPTION

Figure 1:
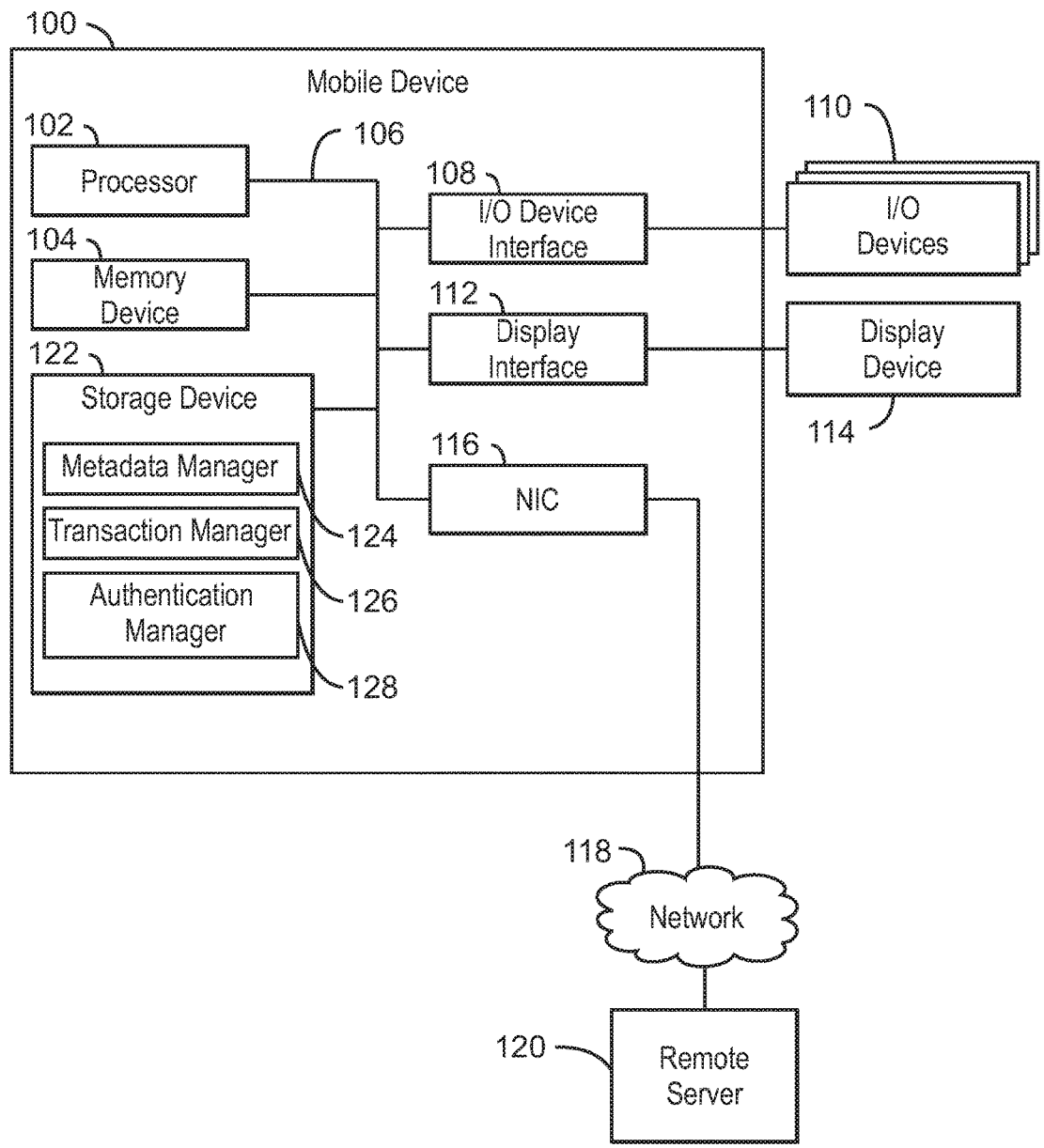
FIG. 1 depicts a block diagram of an example computing system that can authenticate transactions according to an embodiment described herein.

Mobile computing devices can include any number of sensors that collect data regarding the environment of the mobile computing devices. For example, mobile computing devices can include global positioning system (GPS) sensors, accelerometers, gyrometers, compasses, and the like. In some examples, the mobile computing devices can store sensor data from the sensors to improve application functionality and enable remote services that are executed based on the sensor data.

In some examples, the sensor data from the mobile devices can be used to authenticate transactions provided by a remote service provider. For example, a remote service provider may provide product related services, financial related services and the like. The remote service provider can attempt to authenticate a transaction for a remote service based on information stored on a mobile device. For example, a remote service provider can transmit the transaction and any other suitable information corresponding to the transaction to a remote server in a data center. The remote server can then transmit information corresponding to the transaction to a mobile device associated with the transaction. The remote service provider may rely on authentication information from a mobile device associated with a user initiating a transaction.

The embodiments described herein include techniques for authenticating transactions. In some examples, a device can detect metadata corresponding to a user of a mobile device, wherein the metadata comprises a call history from the mobile device. The device can also detect transaction information corresponding to the user of the mobile device from a remote server, wherein the transaction information corresponds to a transaction initiated at a remote service provider and wherein the transaction information indicates a transaction type and transaction initiator information. Additionally, the device can generate an authentication score of the transaction based on the metadata and the transaction information. The device can then authorize the transaction based on the authentication score or send the authentication score to a remote device to enable the remote device to authorize the transaction. In some examples, the device can also send additional metrics to the remote device. In some embodiments, the additional metrics can include GPS information, a call history, and the like, which can enable a remote server to perform an investigation and forensics analysis. In some examples, the device can implement consent management, where the additional metrics may be transmitted for certain purposes, and can be usable for a certain period of time. Sending such data to a remote server may be done with the consent of the user in an online manner or in an offline manner, where the user may opt-in to send such information.

The techniques described herein can reduce a number of unauthorized transactions performed by a remote service provider. Furthermore, the techniques described herein can prevent unauthorized access of metadata and other information from a mobile device by evaluating or authenticating a transaction locally on the mobile device without transmitting the metadata or other information to a remote server.

With reference now to FIG. 1, an example computing device is depicted that can authenticate transactions. The mobile computing device 100 may be for example, a server, desktop computer, laptop computer, tablet computer, or smartphone. In some examples, mobile computing device 100 may be a cloud computing node. Mobile computing device 100 may be described in the general context of computer system executable instructions, such as program modules, being executed by a computer system. Generally, program modules may include routines, programs, objects, components, logic, data structures, and so on that perform particular tasks or implement particular abstract data types. Mobile computing device 100 may be practiced in distributed cloud computing environments where tasks are performed by remote processing devices that are linked through a communications network. In a distributed cloud computing environment, program modules may be located in both local and remote computer system storage media including memory storage devices.

The mobile computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the mobile computing device 100 to one or more I/O devices 110. The I/O devices 110 may include, for example, a keyboard and a pointing device, wherein the pointing device may include a touchpad or a touchscreen, among others. The I/O devices 110 may be built-in components of the mobile computing device 100, or may be devices that are externally connected to the mobile computing device 100.

The processor 102 may also be linked through the system interconnect 106 to a display interface 112 adapted to connect the mobile computing device 100 to a display device 114. The display device 114 may include a display screen that is a built-in component of the mobile computing device 100. The display device 114 may also include a computer monitor, television, or projector, among others, that is externally connected to the mobile computing device 100. In addition, a network interface controller (NIC) 116 may be adapted to connect the mobile computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the mobile computing device 100 through the network 118. In some examples, the remote server 120 can send an authentication request for a transaction to the mobile computing device 100.

The processor 102 may also be linked through the system interconnect 106 to a storage device 122 that can include a hard drive, an optical drive, a USB flash drive, an array of drives, or any combinations thereof. In some examples, the storage device 122 may include a metadata manager 124 that can detect metadata corresponding to a user of a mobile device, wherein the metadata comprises a call history from the mobile device. The metadata can also include additional information such as a browsing history for a user of a mobile device, location history for a mobile device, sensor data from the mobile device, data from communications initiated from other programs or applications on the mobile device, and the like. For example, the metadata can include data corresponding to applications that interface with online marketplaces, social networking applications, and texting applications, among others. In some embodiments, a transaction manager 126 can detect transaction information corresponding to the user of the mobile device from a remote server, wherein the transaction information corresponds to a transaction initiated at a remote service provider. In some examples, the transaction information also indicates a transaction type and transaction initiator information. For example, a transaction type can indicate that a transaction is related to a point of sale transaction, a product related service, or a financial service, among others. The transaction initiator information can indicate a location associated with the remote service provider, a time of the transaction, and any other information about the remote service provider.

Additionally, in some embodiments, an authentication manager 128 can generate an authentication score of the transaction based on the metadata and the transaction information. The authentication score can indicate likelihood that the transaction initiated at the remote service provider was authorized based on a combination of the transaction information and the metadata from the mobile device, which corresponds to the user associated with the transaction. The authentication manager 128 can also authorize the transaction based on the authentication score. For example, the authentication manager 128 can send the authentication score to a remote server, wherein the remote server can determine if the authentication score exceeds a threshold indicating the transaction is authorized. The authentication manager 128 can also send an authentication response to a remote server indicating if the transaction is authorized or unauthorized.

It is to be understood that the block diagram of FIG. 1 is not intended to indicate that the mobile computing device 100 is to include all of the components shown in FIG. 1. Rather, the mobile computing device 100 can include fewer or additional components not illustrated in FIG. 1 (e.g., additional memory components, embedded controllers, modules, additional network interfaces, etc.). Furthermore, any of the functionalities of the metadata manager 124, the transaction manager 126, and the authentication manager 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the metadata manager 124, the transaction manager 126, and the authentication manager 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
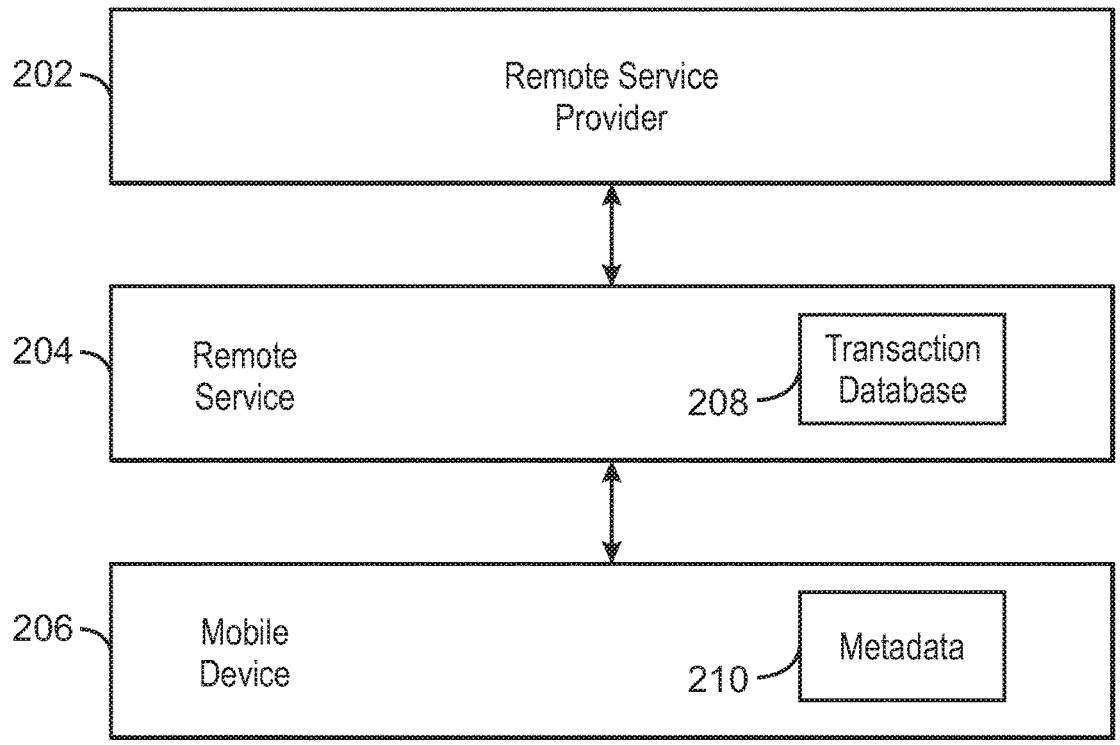
FIG. 2 is a block diagram of a system for authenticating transactions.

FIG. 2 is a block diagram illustrating an example system for authenticating transactions. The system can include a remote service provider 202, a remote server 204, and a mobile device 206. In some embodiments, the remote service provider 202 can detect an initiation of a transaction and send a transaction type along with transaction initiator information to the remove server 204. As discussed above, a transaction type can indicate that a transaction is related to a point of sale transaction, a product related transaction, or a financial related transaction, among others. The transaction initiator information can indicate a location associated with the remote service provider 202, a time of the transaction, and any other information about the remote service provider 202. In some embodiments, the remote service provider 202 can send the transaction to the remote server 204 and the remote server 204 can identify a transaction type.

In some embodiments, the remote server 204 can include a transaction database 208 or any other suitable memory component that stores user information. The remote server 204 can query the transaction database 208 to determine a user and mobile device associated with the transaction. For example, the remote server 204 can detect that information provided to the remote service provider 202, such as a credit card number or any other suitable information, is associated with a user and the user's mobile device. The remote server 204 can then transmit transaction information to the mobile device 206. For example, the remote server 204 can transmit the transaction type and transaction initiator information to the mobile device 206.

In some embodiments, the mobile device 206 can detect metadata 210 corresponding to a user of a mobile device. The metadata 210 can include a call history, browsing history, sensor data, and location history, among others. The mobile device 206 can also detect the transaction information corresponding to the user of the mobile device from the remote server 204. Additionally, the mobile device 206 can generate an authentication score of the transaction based on the metadata 210 and the transaction information. The mobile device 206 can also authorize the transaction based on the authentication score. For example, the mobile device 206 can send the authentication score to the remote server 204 or send an authentication response to the remote server indicating whether the transaction is to be approved. The techniques described herein can prevent unauthorized access of metadata 210, sensor data, and other information from a mobile device 206 by authenticating a transaction locally on the mobile device 206 without transmitting the metadata 210 or other information to the remote server 204.

In some examples, the mobile device 206 can authenticate a transaction in which a card is not presented to the remote service provider 202. For example, a monitor application stored on the mobile device 206 can browse a mobile call history. If the mobile device 206 recently communicated with the remote service provider 202, the transaction can be authenticated with a higher probability or authentication score.

In some examples, the mobile device 206 can authenticate a transaction in which a card is not presented to the remote service provider 202 based on a browsing history of the remote service provider. For example, the remote service provider 202 can transmit a portion of the browsing history of its web store to the mobile device 206. If the mobile device 206 detects that a user of the mobile device 206 recently browsed the web store of the remote service provider 202 based on user credentials, internet protocol address of the mobile device 206, or any other identification method, then the transaction can be authenticated with a higher probability or authentication score.

In some examples, the mobile device 206 can authenticate a transaction with or without a card being presented to a remote service provider 202. For example, if a user of the mobile device 206 has a history of connections with a similar type of remote service provider, the transaction can be authenticated with a higher probability. For example, the mobile device 206 can detect that a transaction corresponds to a type of product such as computer hardware, among others. The mobile device 206 may detect that a user of the mobile device has communicated with a number of remote service providers regarding computer hardware within a period of time. The mobile device 206 can then provide a higher authentication score.

In some examples, the mobile device 206 can authenticate a transaction in which a card is not presented to a remote service provider 202. For example, a monitor application of the mobile device 206 can browse or monitor a user's mobile activity, browsing history, interests, social networks activity, and the like. The authentication score can incorporate the monitored information to increase the accuracy of authorizing the transaction. For example, the mobile device 206 can increase an authentication score if a transaction is for a type of product that corresponds to searches in a browsing history or social network for products of the same type.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional memory components, modules, additional network interfaces, etc.).

Figure 3:
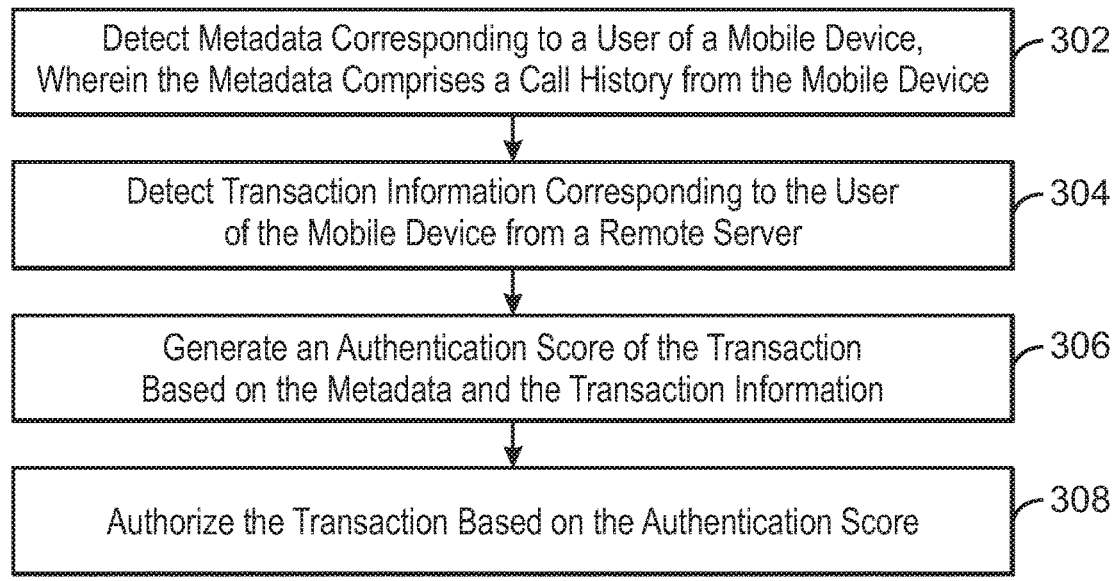
FIG. 3 is a process flow diagram of an example method that can authenticate transactions according to an embodiment described herein.

FIG. 3 is a process flow diagram of an example method that can authenticate transactions. The method 300 can be implemented with any suitable computing device, such as the computing device 100 of FIG. 1.

At block 302, a metadata manager 124 can detect metadata corresponding to a user of a mobile device, wherein the metadata comprises a call history from the mobile device. A call history, as referred to herein, can indicate any suitable number of phone numbers called from a mobile device, any number of phone numbers from which the mobile device received a call. In some embodiments, the call history can be based on any suitable period of time. For example, a call history can be based on a previous day, week, month, or any other suitable time period. In some embodiments, the call history can include a timestamp associated with each call. In some examples, the call history can also include text messages received by the mobile device or sent to other devices.

In some embodiments, the metadata further includes a browsing history and a location history. The browsing history can indicate any number of web pages and web applications that a mobile device has accessed within a period of time. In some examples, the metadata can also include data from communications initiated from other programs or applications on the mobile device, and the like. For example, the metadata can include data corresponding to applications that interface with online marketplaces, among others. In some embodiments, the metadata can be stored locally by a monitoring application on a mobile device or retrieved from an operating system of the mobile device in response to a query for the metadata. In some embodiments, the metadata manager 124 can detect the metadata from a global positioning system sensor, an accelerometer, a gyrometer, a compass, or any combination thereof. For example, the metadata manager 124 can store any number of locations of a mobile device within a period of time to determine an area in which the mobile device is in use.

At block 304, a transaction manager 126 can detect transaction information corresponding to the user of the mobile device from a remote server, wherein the transaction information corresponds to a transaction initiated at a remote service provider. The transaction information can also indicate a transaction type and transaction initiator information. In some embodiments, the transaction initiator information can include a phone number of the remote service provider, an internet protocol address of the remote service provider, a uniform resource location associated with the remote service provider, a location of the remote service provider, or any combination thereof. In some embodiments, the transaction type can include a financial based service or a product based service, among others. For example, a product based service can include purchasing a product at a point of sale device and the financial based service can include a banking transaction, among others.

At block 306, an authentication manager 128 can generate an authentication score of the transaction based on the metadata and the transaction information. In some examples, the authentication score can be generated using any suitable machine learning technique such as neural networks, or any other artificial intelligence techniques. The authentication score can indicate whether a distance between a mobile device and the remote service provider is below a threshold, whether the remote service provider is located within a perimeter established by previous GPS coordinates of the mobile device, or that a similarity between the transaction and a browsing history of the mobile device exceeds a threshold. In some embodiments, a higher authentication score can indicate an increased likelihood that the transaction is authorized. The authentication manager 128 can increase the authentication score in response to detecting that the mobile device previously called or transmitted an electronic form of communication to the remote service provider. The authentication manager 128 can also increase the authentication score in response to detecting that the mobile device accessed an internet protocol address or uniform resource locator associated with the remote service provider.

In some embodiments, the authentication manager 128 can modify the authentication score based on transaction type. For example, the authentication manager 128 can modify the authentication score to indicate the transaction is authorized in response to detecting that a banking or financial related transaction is from a remote service provider within a predetermined distance of the mobile device. In some examples, the authentication manager 128 can modify the authentication score for a product related service based on detecting that a remote service provider is within a predetermined distance of the mobile device or that the remote service provider is within a perimeter of GPS locations of the mobile device based on a period of time. The authentication manager 128 can also modify the authentication score in response to detecting that the remote service provider is outside a predetermined distance from the mobile device, but the mobile device has called the remote service provider, sent an electronic communication to the remote service provider, or viewed a web site corresponding to the remote service provider within a period of time. In some embodiments, the authentication manager 128 can detect a sleep schedule of a user based on a period of inactivity for a number of consecutive days. The authentication manager 128 can increase or decrease the authentication score based on whether the transaction occurred during a period of inactivity of the mobile device. For example, the authentication manager 128 can detect that a transaction has occurred during a period of inactivity of a mobile device and determine that the transaction is likely unauthorized. In some examples, the authentication manager 128 can then decrease the authentication score based on the likelihood that the transaction is unauthorized. In some examples, the authentication manager 128 can determine whether the inactivity of a mobile device can be used as a contributing factor to the authentication score. In some embodiments, the authentication manager 128 can use any suitable scale to indicate whether a transaction is authorized. For example, a lower authentication score can indicate that a transaction is authorized and the authentication manager 128 can decrease the authentication score based on transaction information or metadata indicating that the transaction is authorized.

At block 308, the authentication manager 128 can authorize the transaction based on the authentication score. In some embodiments, the authentication manager 128 can authorize the transaction by transmitting the authentication score to the remote server. The remote server may store predetermined thresholds regarding whether an authentication score indicates that the transaction is to be approved. In some examples, the authentication manager 128 can provide an authentication response to the remote server. For example, the authentication response can include an approval or a rejection of the transaction. In some embodiments, the authentication manager 128 can generate the authentication response based on the transaction type. For example, the authentication manager 128 may approve product related transactions for an amount of money below a threshold amount with a lower authentication score than a financial related transaction associated with a larger amount of money. In some embodiments, the authentication manager 128 can determine authentication scores are to exceed a predetermined value in order to authorize a transaction, wherein the predetermined value can be based on transaction type, time of day, or any other suitable information.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the authentication manager 128 can also indicate to a remote server to request additional authentication information from the user via a text message, a phone call, or a notification. In some examples, the additional authentication information is provided by a mobile device and can be prompted by a remote server. For example, the additional authentication information can indicate that a remote server is to prompt a user of a mobile device to respond to the remote server with an alphanumeric code, select a notification on a mobile device, select a hyperlink provided in an email, and the like. In some embodiments, the remote server can send the additional authentication information to the mobile device and the authentication manager 128 can revise the authentication score based on the additional authentication information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
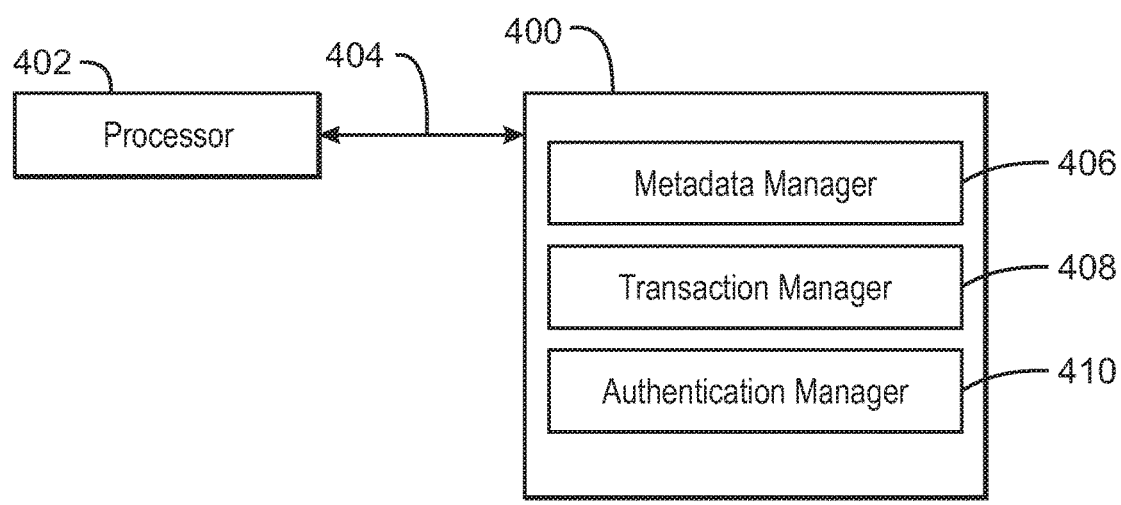
FIG. 4 is a tangible, non-transitory computer-readable medium that can authenticate transactions according to an embodiment described herein.

Referring now to FIG. 4, a block diagram is depicted of an example of a tangible, non-transitory computer-readable medium that can authenticate transactions. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a metadata manager 406 that can detect metadata corresponding to a user of a mobile device, wherein the metadata comprises a call history from the mobile device. In some embodiments, a transaction manager 408 can detect transaction information corresponding to the user of the mobile device from a remote server, wherein the transaction information corresponds to a transaction initiated at a remote service provider. In some examples, the transaction information also indicates a transaction type and transaction initiator information. Additionally, in some embodiments, an authentication manager 410 can generate an authentication score of the transaction based on the metadata and the transaction information. The authentication manager 410 can also authorize the transaction based on the authentication score.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
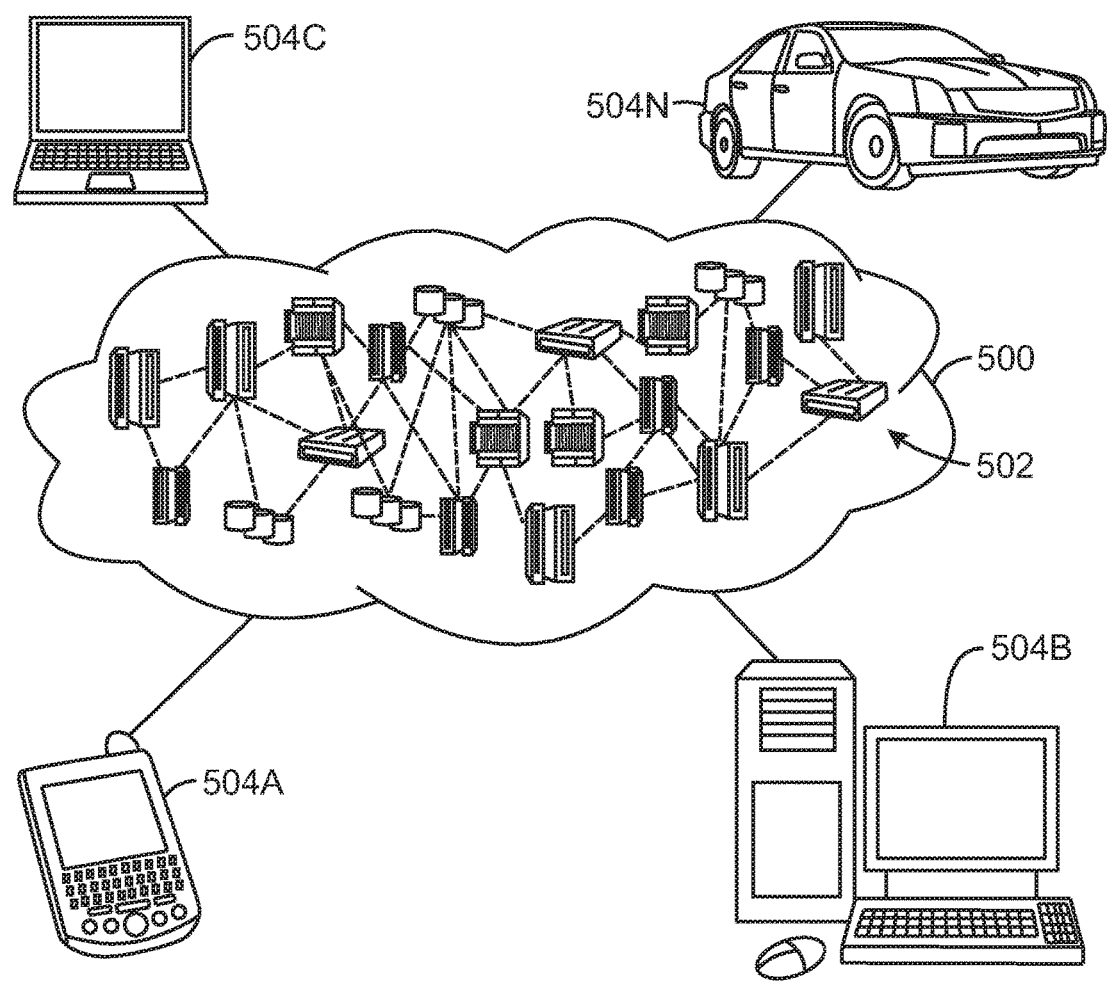
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
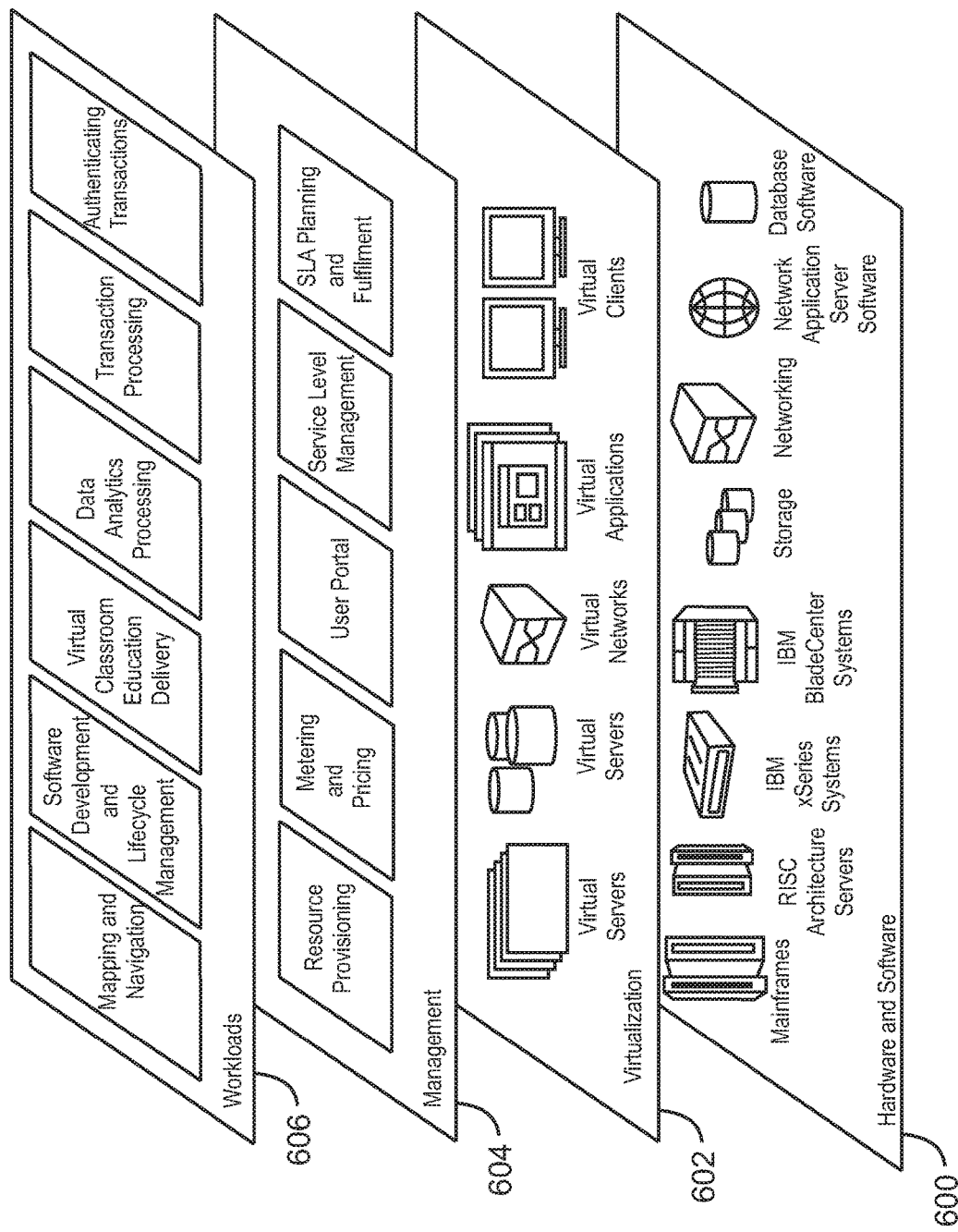
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and authenticating transactions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device comprising:
 a processor to:
 detect metadata corresponding to a user of the mobile device, wherein the metadata comprises a call history, a user browsing history, and user credentials from the mobile device;
 detect transaction information corresponding to the user of the mobile device from a remote server, wherein the transaction information corresponds to a transaction initiated at a remote service provider and wherein the transaction information indicates a transaction type, a portion of a browsing history of a web store of the remote server, and transaction initiator information that is to be used to determine locally on the mobile device whether a phone number of the remote service provider is in the call history of the mobile device;
 generate an authentication score of the transaction based on the metadata and the transaction information, the generating of the authentication score comprising identifying that the user credentials correspond to the user of the mobile device and the user credentials correspond to the portion of the browsing history of the web store of the remote server and identifying that the mobile device is actively in use by the user of the mobile device during a time the transaction is initiated at the remote service provider, the authentication score to be increased in response to detecting that the transaction is associated with a type of product corresponding to at least one search in the user browsing history of the metadata; and
 authorize the transaction based on the authentication score by sending an authentication response comprising an approval or a rejection of the transaction to the remote server, the authorizing of the transaction based on the authentication score being above a predetermined value, the transaction authorization to be determined locally on the mobile device without transmitting the metadata from the mobile device to the remote server.

2. The mobile device of claim 1, wherein the processor is to authorize the transaction by transmitting the authentication score to the remote server.

3. The mobile device of claim 1, wherein the transaction initiator information comprises a phone number of a transaction initiator, an internet protocol address of the transaction initiator, a uniform resource location associated with the transaction initiator, or any combination thereof.

4. The mobile device of claim 1, wherein the transaction type comprises a financial based service or a product based service.

5. The mobile device of claim 1, wherein the metadata further comprises data from communications initiated from an application, and a location history.

6. The mobile device of claim 1, wherein the processor is to indicate to the remote server to request additional authentication information from the user via a text message, a phone call, or a notification.

7. A method for authenticating transactions comprising:
detecting, via a processor, metadata corresponding to a user of a mobile device, wherein the metadata comprises a call history, a user browsing history, and user credentials from the mobile device;
detecting, via the processor, transaction information corresponding to the user of the mobile device from a remote server, wherein the transaction information corresponds to a transaction initiated at a remote service provider and wherein the transaction information indicates a transaction type, a portion of a browsing history of a web store of the remote server, and transaction initiator information that is to be used to determine locally on the mobile device whether a phone number of the remote service provider is in the call history of the mobile device;
generating, via the processor, an authentication score of the transaction based on the metadata and the transaction information, the generating of the authentication score comprising identifying that the user credentials correspond to the user of the mobile device and the user credentials correspond to the portion of the browsing history of the web store of the remote server and identifying that the mobile device is actively in use by the user of the mobile device during a time the transaction is initiated at the remote service provider, the authentication score to be increased in response to detecting that the transaction is associated with a type of product corresponding to at least one search in the user browsing history of the metadata; and
authorizing, via the processor, the transaction based on the authentication score by sending an authentication response comprising an approval or a rejection of the transaction to the remote server, the authorizing of the transaction based on the authentication score being above a predetermined value, the transaction authorization to be determined locally on the mobile device without transmitting the metadata from the mobile device to the remote server.

8. The method of claim 7 comprising authorizing the transaction by transmitting the authentication score to the remote server.

9. The method of claim 7, wherein the transaction initiator information comprises a phone number of a transaction initiator, an internet protocol address of the transaction initiator, a uniform resource location associated with the transaction initiator, or any combination thereof.

10. The method of claim 7, wherein the transaction type comprises a financial based service or a product based service.

11. The method of claim 7, wherein the metadata further comprises data from communications initiated from an application, and a location history.

12. The method of claim 7 comprising indicating to the remote server to request additional authentication information from the user via a text message, a phone call, or a notification.

13. A computer program product for authenticating transactions, the computer program product comprising a computer readable storage medium having program instructions embodied therewith, wherein the computer readable storage medium is not a transitory signal per se, the program instructions executable by a processor to cause the processor to:
detect metadata corresponding to a user of a mobile device, wherein the metadata comprises a call history, a user browsing history, and user credentials from the mobile device;
detect transaction information corresponding to the user of the mobile device from a remote server, wherein the transaction information corresponds to a transaction initiated at a remote service provider and wherein the transaction information indicates a transaction type, a portion of a browsing history of a web store of the remote server, and transaction initiator information that is to be used to determine locally on the mobile device whether a phone number of the remote service provider is in the call history of the mobile device;
generate an authentication score of the transaction based on the metadata and the transaction information, the generating of the authentication score comprising identifying that the user credentials correspond to the user of the mobile device and the user credentials correspond to the portion of the browsing history of the web store of the remote server and identifying that the mobile device is actively in use by the user of the mobile device during a time the transaction is initiated at the remote service provider, the authentication score to be increased in response to detecting that the transaction is associated with a type of product corresponding to at least one search in the user browsing history of the metadata; and
authorize the transaction based on the authentication score by sending an authentication response comprising an approval or a rejection of the transaction to the remote server, the authorizing of the transaction based on the authentication score being above a predetermined value, the transaction authorization to be determined locally on the mobile device without transmitting the metadata from the mobile device to the remote server.

14. The computer program product of claim 13, wherein the program instructions cause the processor to authorize the transaction by transmitting the authentication score to the remote server.

15. The computer program product of claim 13, wherein the transaction initiator information comprises a phone number of a transaction initiator, an internet protocol address of the transaction initiator, a uniform resource location associated with the transaction initiator, or any combination thereof.

16. The computer program product of claim 13, wherein the program instructions cause the processor to detect the metadata from a global positioning system sensor, an accelerometer, a gyrometer, a compass, or any combination thereof.

* * * * *